Figure 1:
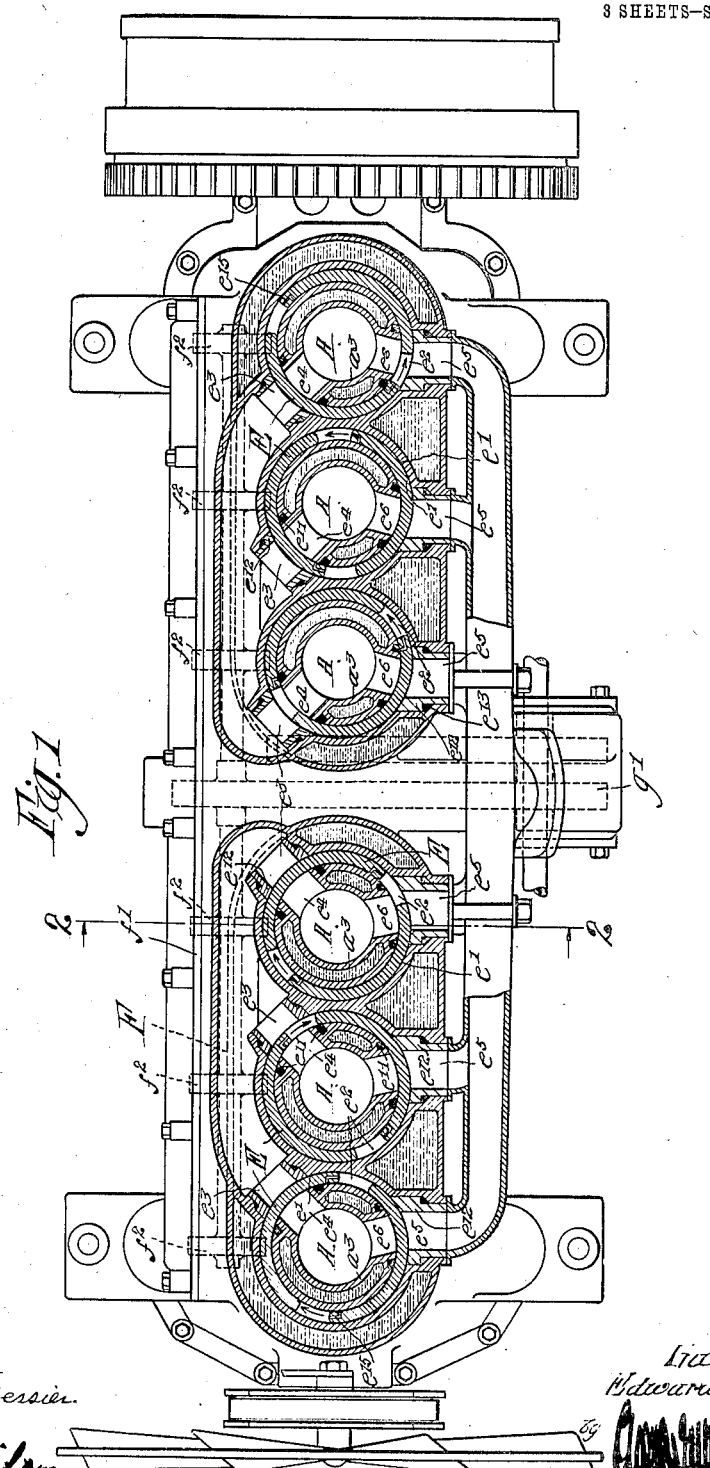

E. H. BELDEN.
INTERNAL-EXPLOSION ENGINE.
APPLICATION FILED OCT. 3, 1913.

1,126,356.

Patented Jan. 26, 1915.
3 SHEETS—SHEET 1.

Witnesses:-
Valois E. Messier
Edward J. Wilson

Inventor:-
Edward H. Belden

E. H. BELDEN.
INTERNAL EXPLOSION ENGINE.
APPLICATION FILED OCT. 3, 1913.
1,126,356.
Patented Jan. 26, 1915.
3 SHEETS—SHEET 2.
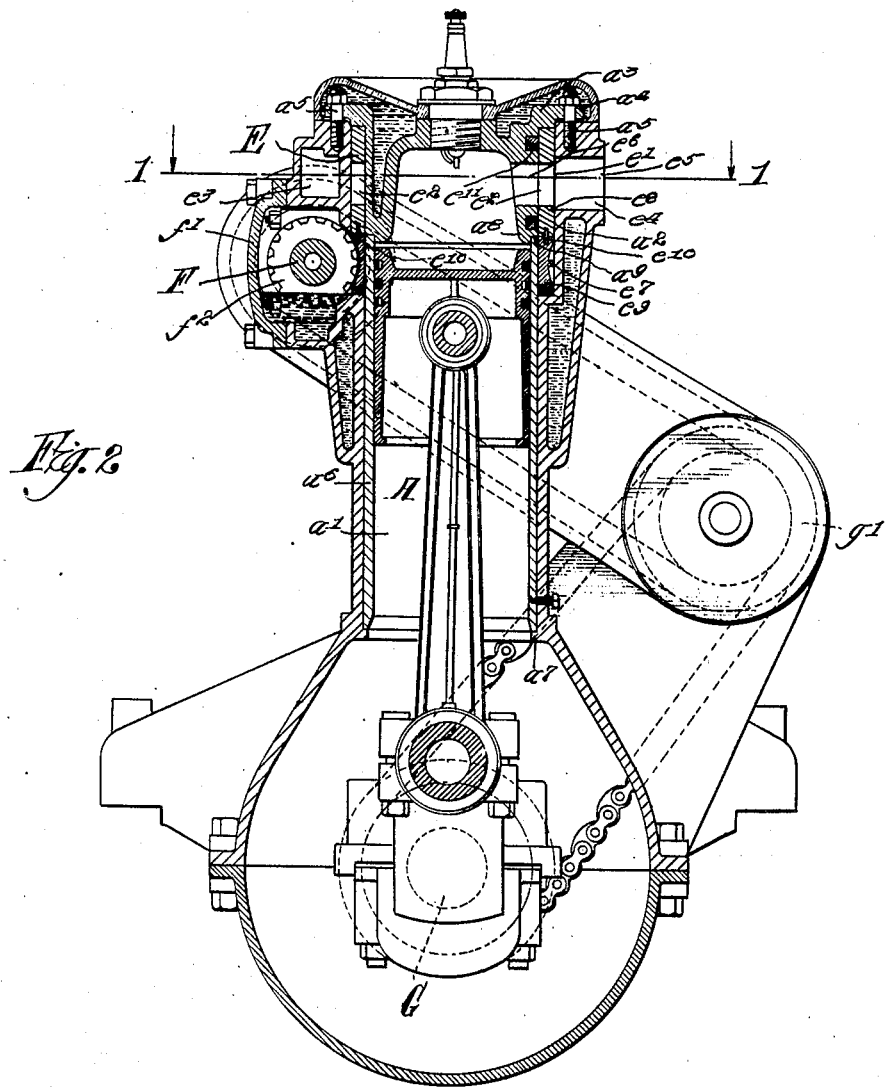
Fig. 2
Witnesses:
Valois E. Mossier
Edward J. Wilson
Inventor:
Edward H. Belden
Atty.

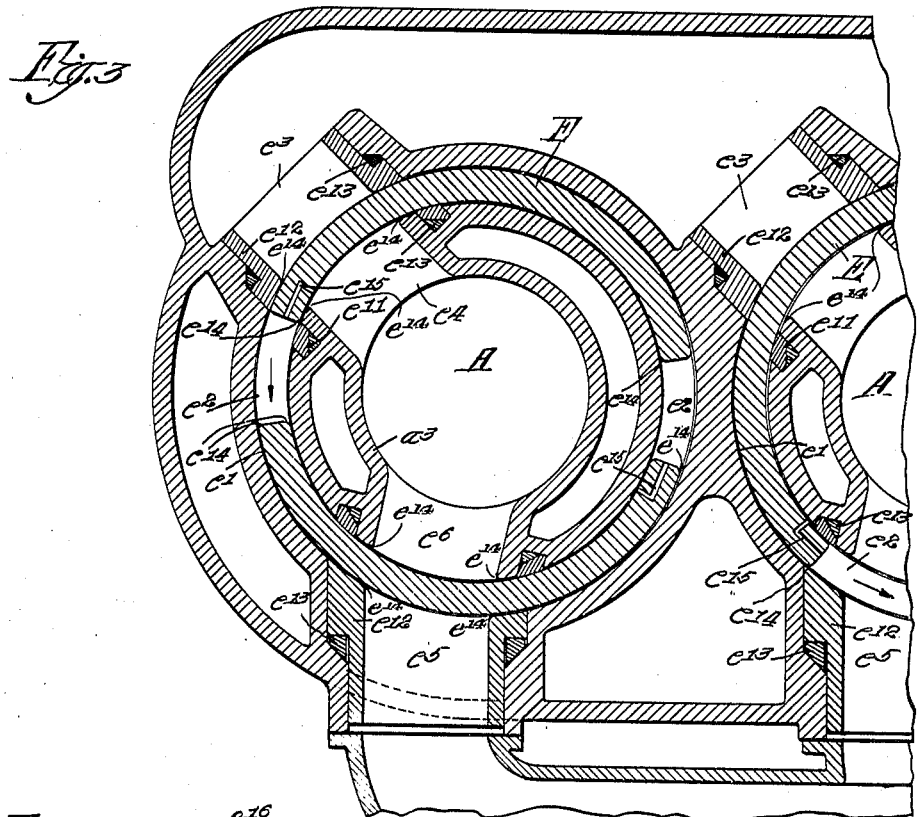
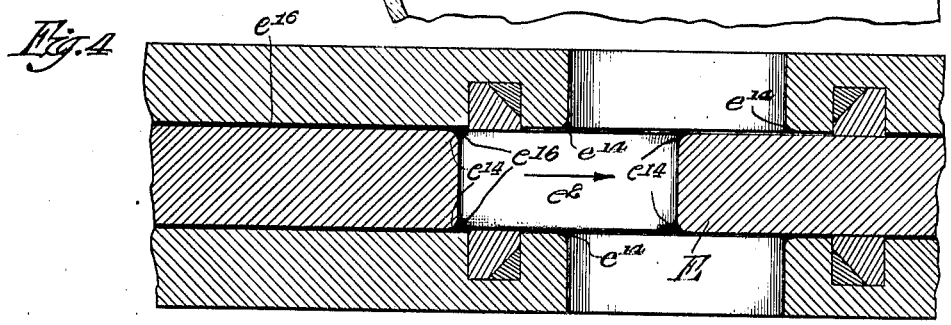
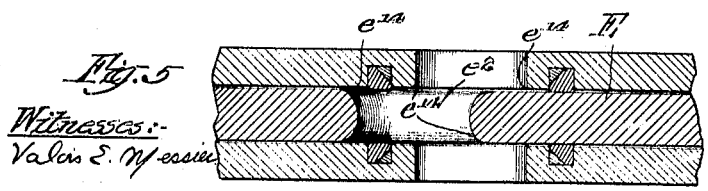

UNITED STATES PATENT OFFICE.

EDWARD HALE BELDEN, OF PITTSBURGH, PENNSYLVANIA, ASSIGNOR TO BELDEN ENGINEERING COMPANY, OF PITTSBURGH, PENNSYLVANIA, A CORPORATION OF PENNSYLVANIA.

INTERNAL-EXPLOSION ENGINE.

1,126,356.   Specification of Letters Patent.   Patented Jan. 26, 1915.

Application filed October 3, 1913. Serial No. 793,120.

*To all whom it may concern:*

Be it known that I, EDWARD H. BELDEN, a citizen of the United States, and a resident of Pittsburgh, county of Allegheny, and State of Pennsylvania, have invented certain new and useful Improvements in Means for Conserving Valve-Oil in Internal-Explosion Engines, of which the following is a specification.

My invention relates to improvements in internal combustion engines having rotary valves and has particular reference to improved means for conserving valve oil in such engines.

The object of my invention is to increase the efficiency and reduce the operating expense of such internal combustion engines; to increase the relative quantity of power delivered and reduce the internal friction; to conserve the lubricating oil particularly as applied to the rotary controlling valves, to prevent the escape of the oil into the inlet and exhaust ports and passages, and to prevent the formation of smoke and obnoxious gases or odors in the exhaust gases of the engine.

A further object of my invention is to so improve the rotary valves and ported valve chambers of internal combustion engines that the valves may be constantly lubricated and the oil by which they are lubricated prevented from accumulating in the gas ports or passages leading to and from the cylinder.

My invention consists in an internal combustion engine having a rotary valve or valves and in which the edges of the ports are so formed that the valve oil is prevented from accumulating in the ports. The accumulation of the oil within the ports is detrimental for many reasons. In the first place the oil thus lodged in the ports is either carried into the cylinder by the inlet gases or carried out through the exhaust pipe by the gases as they escape from the cylinder. In either case the oil as lubricating oil is destroyed. If it is carried into the cylinder it prevents the most efficient combustion of the fuel gas and tends to coat the walls of the cylinder, valve and passages with carbon. If it is carried into the exhaust it is partially gasified and is exhausted with the exhaust gases in the form of objectionable smoke.

In an engine embodying my invention the valves and the walls of the valve chambers are provided with coöperating admission and exhaust ports and the edges of these ports, particularly the following edges, are chamfered or rounded in such manner that the oil which is in the valve chamber is not accumulated within the port of the valve, nor within the exhaust or inlet passages. While it is true that the rear edge only of the valve port need be rounded or chamfered and the forward edge of the ports which penetrate the walls of the chamber, in practice I usually round or chamfer both the forward and rear edges of all of the ports and passages so that the valves may be operated in either direction with equal efficiency and also so that if the rotation of the valves is reversed, they will not scrape oil into the ports or passages.

My invention consists in the several features of construction and in the combination and arrangement of parts whereby the above mentioned and other objects are attained and all as hereinafter described and particularly pointed out in the appended claims.

My invention will be more readily understood by reference to the accompanying drawings forming part of this specification and in which—

Figure 1 is a horizontal sectional view of a multiple cylinder internal combustion engine equipped with rotary valves embodying my invention, the section being taken upon the line 1—1 of Fig. 2; Fig. 2 is a vertical section of one of the engine cylinders on the line 2—2 of Fig. 1; Fig. 3 is an enlarged fragmentary section similar to that shown in Fig. 1 and clearly illustrates the rounding or chamfering of the several corners or edges of the ports and passages; Fig. 4 is an enlarged fragmentary section diagrammatically illustrating the principle of my invention as applied to a valve which is movable in a chamber, between two oppositely disposed ported seats; and Fig. 5 is a view similar to Fig. 4 showing a modified form of the non-oil-accumulating edges of the ports.

While my invention is applicable to substantially all forms of rotary valves wherein the valve and its seat move relatively to each other, I have chosen to illustrate my valve chamber as having inner and outer walls of slightly smaller and larger diameters respectively than the valve and which chamber is constantly supplied with lubricating oil. The difference in the diameters between the valve and its inclosing walls provides space wherein the oil which lubricates the valve in its movement over the inclosing surface is contained. In this form of valve and engine the valve is an annular sleeve or ring and is provided between its ends with two oppositely disposed ports and the cylinder is provided, upon one side, with inlet and exhaust passages which enter the valve chamber the two ports in the valve being adapted to successively register with the inlet and exhaust passages and control the inlet and exhaust of the gases to and from the cylinder. The valve is constantly rotated in one direction and if the port therein is not formed in accordance with my invention the movement of the valve over its seat tends to scrape or remove the oil from the adjacent surface of the seat or inclosing wall of the chamber and drive it forward into the port. Not only this, but the movement of the valve over the seat tends to scrape the oil from the surface of the valve itself and deposit it in the inlet and exhaust ports or passages which enter the valve chamber. By means of my invention I am enabled to eliminate this accumulation of oil in the ports and passages and confine the oil to the spaces between the valve and its seats and thus I am enabled to eliminate the possibility of the engine when running, ejecting smoke and unpleasant odors from the exhaust, as substantially all of these odors and the smoke result from the entrance of lubricating or valve oil into the several passages or into the cylinder itself, and I am also enabled to most efficiently conserve the valve oil.

In the form of engine illustrated, I provide an oil conduit or passage adjacent to the upper end of the cylinder and containing a valve actuator which is adapted to rotate all of the valves of the multiple cylinder engine. This oil cavity or oil conduit is in free communication with all of the valve chambers and the valve actuator serves to carry the oil from the oil conduit to and upon the rotating valves. The valves themselves serve to distribute the oil constantly throughout the valve chambers and the valves are consequently in a sense constantly floating in oil. As a further means of conserving the valve oil, I combine with the chamfered or rounded edges of the ports and passages another improved feature, namely, that of destroying the vacuum in the valve port after the inlet port has been closed. It is well known that upon one stroke of the piston in a four cycle engine the piston draws the fuel gases into the cylinder and in so doing creates more or less of a vacuum in the inlet port and passages and as the valve rotates to a position where its port is inclosed by the walls of the chamber, it carries with it, to some extent, the vacuum created while the port is open. The port in passing between the chamber walls and carrying this vacuum would tend to suck the oil from between the valve and the walls of the chamber into the port and for the purpose of preventing this flowing of oil into the port in the valve I provide the valve with a vacuum destroying passage which extends from the port through the valve to such a point that when the valve is rotated to a position where the port is inclosed between the walls of the chamber the opposite end of the passage remains in communication with the cylinder until such time as pressure accumulates in the cylinder by the return stroke of the piston. This pressure is communicated to the port through the passage and serves to destroy the vacuum and in place thereof provide a slight pressure which not only prevents the sucking of the oil into the valve port but actually forces the oil back from the port between the surface of the valve and the chamber. I further combine with the rounded or chamfered edges of the ports and passages the advantages of packing rings which are arranged in the walls of the chamber and surrounding the inlet and exhaust passages. These packing rings serve to limit the carrying of the oil upon the surface of the valve into the several ports, and while not essential to the practical and efficient operation of the rounded edges, serve to assist in the conserving of the oil, for if the oil is permitted to be carried into the inlet port upon the inner surface of the valve there are times when the temperature within the cylinder is such that the oil upon the exposed surface of the valve is gasified or vaporized and consequently the oil gradually wastes away.

In the multiple cylinder engine shown in the drawings each cylinder A has a piston space $a^1$ and a head receiving space $a^2$. The head $a^3$ of the cylinder projects downwardly from the upper end thereof and is provided on its upper end with a securing flange $a^4$ and is held in place by means of bolts $a^5$. I preferably provide the cylinder with a sleeve lining $a^6$ which extends from the lower end of the cylinder upwardly slightly beyond the working part of the cylinder. I provide the cylinder with a circumferential shoulder $a^7$ at its lower end and upon which the lower end of the sleeve rests. The inner end $a^8$ of the head is provided with an external groove $a^9$ which is adapted to receive the upper end of the sleeve and the lower end of the head projects downwardly and enters into the upper end of the sleeve, whereby the sleeve and head are joined.

Surrounding the head I arrange a sleeve valve E and I counterbore or enlarge the cylinder at this point to provide an annular valve chamber $e^1$, the inner diameter of which is slightly smaller than the valve and the outer diameter of which is slightly larger than the valve, thereby providing oil space both within and without the valve. The valve, as clearly shown in Fig. 3, is in the form of an annular sleeve and is provided with two oppositely disposed ports $e^2$ arranged between the ends of the valve. The wall of each cylinder and its head contain inlet passages $e^3$ and $e^4$ respectively and exhaust passages $e^5$ and $e^6$ respectively, and the ports $e^2$ in the valve are adapted, as the valve is rotated, to successively register with these inlet and exhaust passages and thereby admit and exhaust the gases to and from the cylinder. For the purpose of operating the valves, I provide a longitudinal shaft F arranged near the upper part of the cylinder casting within a shaft conduit or housing $f^1$ adapted to be constantly rotated by the shaft G of the engine through the medium of the gearing $g^1$, which connects the engine shaft to the valve shaft. The conduit within which the shaft F is arranged is closed and is adapted to carry lubricating oil therein. The shaft is provided with gears $f^2$, one for each cylinder, arranged to enter respective valve chambers and each valve is provided, on its lower end with an annular gear $e^7$ connected to the valve proper $e^8$ by dowels $e^{10}$ and adapted to be engaged by the gear $L^1$ and thereby the valve is constantly rotated. I provide, in the walls of the valve chamber and surrounding the inlet and exhaust passages, packing rings both within and without the valve. The packing rings $e^{11}$ are arranged in the head and bear against the inner surface of the valve and similar packing rings $e^{12}$ are arranged in the wall of the cylinder adapted to bear upon the outer surface of the valve. These packing rings are provided with continuous bearing surfaces contacting with the adjacent surface of the valve and are constantly pressed against the valve with a yielding pressure by means of spring rings $e^{13}$ arranged behind the bearing rings.

In Fig. 3 I have clearly illustrated the rounded or chamfered edges $e^{14}$ in the ports $e^2$ and, as shown, I preferably round or chamfer both the forward and the rear edges of all ports, so that whether the valve rotates in one direction or the other, the valve ports will be chamfered upon their rear edges. The valve ring in Fig. 3 is shown in position where the valve port has just passed the inlet passage and is confined between the opposed walls of the chamber, in which position under ordinary conditions a slight vacuum would be contained within the port, but I provide a small relief passage $e^{15}$ through the body of the valve and which has one end entering the port $e^2$ and ending at its other end at the inner surface of the valve in suc ha position that when the valve attains the position shown in Fig. 3 the port $e^2$ is still in communication with the interior of the cylinder. The passage $e^{15}$ is long enough so that the port $e^2$ is in communication with the cylinder until the piston commences its return or compression stroke and the pressure within the cylinder is changed from that of a slight vacuum to that of a slight pressure. This pressure is communicated to the port through the relief passage $e^{15}$ and serves to drive the oil outwardly from the port between the surfaces of the valve and the valve chamber and to prevent the drawing of the oil into the port.

In Fig. 4 I have still more clearly illustrated the non-oil accumulation feature of my invention and therein I have shown the spaces $e^{16}$ between the valve and its inclosing walls as greatly exaggerated so that the idea can be most clearly understood. Of course in practice these spaces are relatively small, in fact not much more than capillary spaces, but as the valve continuously rotates and passes the ports many times in a minute the accumulation of oil even from capillary spaces is ordinarily considerable, but by means of my invention I am enabled to eliminate the necessity of forming only capillary spaces and am enabled to form oil spaces between the valve and its inclosing walls, which are larger or thicker than capillary spaces and yet prevent the accumulation of oil in the passages and ports.

It should be understood that the illustration of my invention as shown in the drawings is merely typical of the many forms in which it might be embodied and that consequently I do not limit or confine my invention to the specific structures shown and described.

I do not herein claim the driving of the valve actuator from a member located between the cranks of the crank shaft, the same being described and claimed in my co-pending application Ser. No. 713,555, filed August 6th, 1912; nor do I herein claim the means shown for packing valve joints at the inlet and exhaust ports of the cylinders, that subject matter being described and claimed in my co-pending application Ser. No. 745,301, filed January 30, 1913; nor do I herein claim that part of the cylinder construction which embraces the cylinder lining or sleeve, the same being both described and claimed in my co-pending application Ser. No. 793,119, filed October 3, 1913.

I claim:

1. An explosion engine having a ported one direction rotary valve, that wall or walls of the port or ports of the valve, which tends to accumulate and drive lubricating oil forward being rounded or beveled in opposition to the relatively straight confining walls of the valve chamber for the purposes described.

2. In an internal combustion engine a one direction cylinder port controlling valve, the engine being provided with a chamber within which the valve is movable, said valve chamber being adapted to contain lubricating oil, the engine being provided with a gas passage entering the chamber and the valve having a port between its ends adapted to register with the passage, the edges of the port being rounded or chamfered as and for the purposes specified.

3. In an internal combustion engine a valve seat having an opening, a cyclic valve movable upon the seat and provided with a port adapted to register with said opening, means for maintaining a film of oil between the valve and the seat, the periphery of the valve port being beveled or rounded on its edge which contacts with the seat to prevent the accumulation of oil within the valve port when the valve moves upon the seat.

4. In an internal combustion engine a valve seat provided with an opening, a one direction rotating valve movable upon the seat and provided with a port adapted to register with the opening, means for maintaining a film of oil between the valve and the seat, the adjacent edges of the valve port and the opening being beveled or rounded to prevent the accumulation of oil within the opening and within the port at times when the valve moves upon the seat.

5. In an internal combustion engine a valve seat provided with an opening through which gas may pass, a one direction valve movable upon the seat and provided with a port adapted to register with said opening for controlling the flow of gas, means for maintaining a film of oil between the valve and the seat, the opening being rounded or beveled to prevent the accumulation of oil in the opening at times when the valve moves upon the seat.

6. In an internal combustion engine an annular sleeve valve, an annular seat of slightly different diameter over and upon which the valve moves and providing a relatively thin annular space between the valve and seat adapted to contain lubricating oil, said seat being provided with an opening through which gas may pass and the valve being provided with a port adapted to register with the opening, means for constantly rotating the valve in one direction, the rear edge of the port being chamfered or rounded to prevent the accumulation of oil within the port when the valve is moving.

7. In an internal combustion engine an annular sleeve valve, and an annular seat of differing diameter and forming with the valve a relatively thin annular space between the valve and seat adapted to contain lubricating oil, said seat being provided with an opening through which gas may pass and the valve being provided with a port adapted to register with the opening, means for constantly rotating the valve in one direction, the forward edge of the opening being rounded or chamfered to prevent the accumulation of oil within the opening when the valve moves upon the seat.

8. In an internal combustion engine, an annular valve and an annular seat, of slightly different diameter than the valve and thereby providing a relatively thin annular space between the valve and seat adapted to contain lubricating oil, said seat being provided with an opening through which gas may pass and the valve being provided with a port adapted to register with the opening, means for constantly rotating the valve in one direction, the rear edge of the valve port and the oppositely disposed edge of the seat opening being rounded or chamfered to prevent the accumulation of oil within the port and the opening when the valve is moving upon the seat.

9. An internal combustion engine provided with an annular chamber having inner and outer walls, an annular one direction rotating valve in the chamber, the walls of the chamber being spaced from the valve, means for maintaining oil within said spaces, the engine being provided with gas passages entering said chamber between its ends and the valve being provided with a port between its ends adapted to register with said passages, the edges of said port being chamfered or rounded to prevent the accumulation of oil within the port when the valve moves in the chamber.

10. In an internal combustion engine provided with an annular valve chamber having inner and outer walls, an annular valve rotatable in one direction in said chamber, the walls of the chamber being spaced from the valve, means for maintaining oil within said spaces, the engine being provided with gas passages entering said chamber between its ends and the valve being provided with a port between its ends adapted to register with said passages, the edges of said passages where they enter the chamber being chamfered or rounded to prevent the accumulation of oil within said passages when the valve moves within the chamber.

11. In an internal combustion engine provided with an annular chamber having inner and outer circumferentially parallel walls adapted to inclose a valve, an annular valve within the chamber, means for rotating the valve in one direction, the walls of the chamber being spaced from the valve, means for maintaining oil within said spaces, the engine being provided with gas passages entering the said chamber between its ends and the valve being provided with a port between its ends adapted to register with said passages, the edges of the periphery of said port and the edges of said passages, where they enter said chamber, being chamfered or rounded as and for the purposes described.

12. In an internal combustion engine having a cylinder, an annular valve arranged within an annular chamber at the outer end of the cylinder and adapted to rotate constantly in one direction, said chamber being adapted to contain lubricating oil which surrounds the valve, admission ports and exhaust passages communicating with said chamber and cylinder, said valve being provided with a port adapted to register with said admission ports and exhaust passages, the rear edges of the port being rounded or chamfered to prevent the accumulation of oil within the port while the valve is in motion.

13. In an internal combustion engine having a cylinder, an annular valve arranged within an annular chamber at the outer end of the cylinder and adapted to be rotated constantly in one direction, said chamber being adapted to contain lubricating oil which surrounds the valve, admission ports and exhaust passages communicating with said chamber and cylinder, said valve being provided with a port adapted to register with said admission ports and exhaust passages, the forward edges of the admission ports and exhaust passages being chamfered or rounded to prevent the accumulation of oil within the said ports and passages at the time when the valve moves within the chamber.

14. In an internal combustion engine having a cylinder, an annular valve arranged within an annular chamber at the outer end of the cylinder and adapted to be rotated constantly in one direction, said chamber being adapted to contain lubricating oil which surrounds the valve, admission ports and exhaust passages communicating with said chamber and cylinder, said valve being provided with a port adapted to register with said admission ports and exhaust passages, the rear edges of the valve port being rounded and the forward edges of the admission ports and exhaust passages being rounded for the purposes described.

15. In an internal combustion engine having a cylinder, an annular valve arranged at the outer end of the cylinder, the cylinder being provided with a substantially closed annular chamber adapted to contain the valve, an inlet gas passage communicating with the cylinder and chamber between the ends thereof, said valve having a port between its ends adapted as the valve rotates to register alternately with the passage and then move to a position between the walls of the chamber, a piston movable within the cylinder and adapted at times to create a vacuum in said port and passage, said valve being provided with a relief passage connecting at one end with the port and at its other end adapted to communicate with the cylinder after the port has passed to a position where it lies between the walls of the chamber.

16. In an internal combustion engine a cylinder and a piston movable therein adapted at times to create a vacuum within the cylinder, a parallel thickness valve associated with the cylinder and movable in one direction to control the inlet and exhaust of gases thereto, the cylinder being provided with a valve chamber having parallel walls between which the valve is movable, said chamber being adapted to contain lubricating oil surrounding the valve, an inlet gas passage entering the cylinder and communicating with said chamber, the valve having a port adapted to register with the said passage at times when the piston forms a vacuum within the cylinder and said valve being provided with a relatively small relief passage communicating at one end with said port and at the other end with the cylinder at times when the valve has moved to a position where the port lies between the walls of the chamber.

17. In an internal combustion engine an annular ported valve, the engine being provied with an annular chamber surrounding the cylinder and substantially fitting the valve and between the walls of which the valve is movable, said chamber being adapted to contain valve lubricating oil, a gas inlet passage entering the engine cylinder through the chamber, the valve having a port which is adapted to register with the passage, means producing a partial vacuum in the passage and port when they are in register, and means for destroying the vacuum in the port immediately the port passes out of register.

18. In an internal combustion engine a cylinder in combination with a piston therein, said cylinder being provided with an annular valve chamber surrounding its outer end, an annular valve rotatable in said chamber, said chamber being adapted to contain valve lubricating oil, gas passages entering the cylinder through said chamber, the valve being provided with a port adapted to register with the passages, packing rings in the walls of the chamber surrounding the passages contacting with and adapted to scrape the adjacent surfaces of the valve, said piston being adapted to create a slight vacuum in the port and passages when they are in register, and said valve being provided with a relief passage of relatively small area, one end of which enters the port of the valve and the other end of which is arranged to communicate with the cylinder when the valve has rotated to a position where the port is out of register with the passage.

In testimony whereof, I have hereunto set my hand this 26th day of September, 1913, in the presence of two subscribing witnesses.

EDWARD HALE BELDEN.

Witnesses:
 EDWARD F. WILSON,
 JOHN R. LEFEVRE.